US011691199B2

(12) United States Patent
Arutinov et al.

(10) Patent No.: US 11,691,199 B2
(45) Date of Patent: Jul. 4, 2023

(54) METHOD AND APPARATUS FOR CREATING AND SINTERING FINE LINES AND PATTERNS

(71) Applicant: Nederlandse Organisatie voor toegepast-natuurwetenschappelijk onderzoek TNO, s-Gravenhage (NL)

(72) Inventors: Gari Arutinov, Helmond (NL); Edsger Constant Pieter Smits, Eindhoven (NL); Jeroen Van Den Brand, Goirle (NL)

(73) Assignee: Nederlandse Organisatie voor toegepast-natuurwetenschappelijk onderzoek TNO, The Hague (NL)

( * ) Notice: Subject to any disclaimer, the term of this patent is extended or adjusted under 35 U.S.C. 154(b) by 0 days.

(21) Appl. No.: 16/965,840

(22) PCT Filed: Jan. 30, 2019

(86) PCT No.: PCT/NL2019/050051
§ 371 (c)(1),
(2) Date: Jul. 29, 2020

(87) PCT Pub. No.: WO2019/151854
PCT Pub. Date: Aug. 8, 2019

(65) Prior Publication Data
US 2021/0023772 A1 Jan. 28, 2021

(30) Foreign Application Priority Data
Jan. 31, 2018 (EP) .................... 18154524

(51) Int. Cl.
B29C 64/112 (2017.01)
B29C 64/188 (2017.01)
(Continued)

(52) U.S. Cl.
CPC ................ B22F 7/04 (2013.01); B22F 10/22 (2021.01); B22F 12/45 (2021.01); B29C 64/112 (2017.08);
(Continued)

(58) Field of Classification Search
CPC ... B29C 64/264; B29C 64/268; B29C 64/273; B29C 64/277; B29C 64/282;
(Continued)

(56) References Cited

U.S. PATENT DOCUMENTS 5,207,955 A * 5/1993 Esrom .................... B29C 59/16
216/58
6,405,095 B1 * 6/2002 Jang ...................... B22F 1/0003
700/118
(Continued)

FOREIGN PATENT DOCUMENTS

CA 1337482 C 10/1995
CN 105009695 A 10/2015
(Continued)

OTHER PUBLICATIONS

European Patent Office, International Search Report in corresponding International Application No. PCT/NL2019/050051, dated May 24, 2019 (3 pages).
(Continued)

Primary Examiner — Philip C Tucker
Assistant Examiner — Jimmy R Smith, Jr.
(74) Attorney, Agent, or Firm — Leydig, Voit & Mayer, Ltd.

(57) ABSTRACT

The invention aims to provide a contactless method to create small conductive tracks on a substrate. To this end a method is provided for selective material deposition, comprising depositing a first material on a substrate; followed by solidifying the first material selectively in a first solidified (Continued)

pattern by one or more energy beams; and followed by propelling non-solidified material away from the substrate by a large area photonic exposure, controlled in timing, energy and intensity to leave the solidified first pattern of the first material.

15 Claims, 8 Drawing Sheets

(51) Int. Cl.
    *B29C 64/245* (2017.01)
    *B29C 64/277* (2017.01)
    *B29C 64/286* (2017.01)
    *B29C 64/35* (2017.01)
    *B29C 64/268* (2017.01)
    *B29C 64/129* (2017.01)
    *B33Y 10/00* (2015.01)
    *B33Y 40/20* (2020.01)
    *B22F 7/04* (2006.01)
    *B22F 10/22* (2021.01)
    *B22F 12/45* (2021.01)
    *B22F 10/73* (2021.01)
    *B22F 10/36* (2021.01)

(52) U.S. Cl.
    CPC .......... *B29C 64/129* (2017.08); *B29C 64/188* (2017.08); *B29C 64/245* (2017.08); *B29C 64/268* (2017.08); *B29C 64/277* (2017.08); *B29C 64/286* (2017.08); *B29C 64/35* (2017.08); *B22F 10/36* (2021.01); *B22F 10/73* (2021.01); *B33Y 10/00* (2014.12); *B33Y 40/20* (2020.01)

(58) Field of Classification Search
    CPC .................. B29C 64/291; B29C 71/04; B29C 2035/0827; B29C 2045/0075; B29C 33/06; B29C 35/0805; B29C 64/112; B29C 64/188; B29C 64/245; B29C 64/286; B29C 64/35; B29C 64/129; B29C 64/135; B22F 10/22; B22F 10/36; B22F 10/66; B22F 10/73; B22F 12/45; B22F 2007/042; B22F 2202/05; B22F 2202/06; B22F 2999/00; B22F 3/16; B22F 7/04; B23K 2101/36; B23K 26/0006; B23K 26/0626; B23K 26/08; B23K 26/342; B33Y 10/00; B33Y 30/00; B33Y 40/20; Y02P 10/25
    USPC ................................................ 425/174, 174.4
See application file for complete search history.

(56) References Cited

U.S. PATENT DOCUMENTS

| | | |
|---|---|---|
| 6,814,823 B1 | 11/2004 | White |
| 2002/0041818 A1 | 4/2002 | Abe et al. |
| 2003/0178395 A1 | 9/2003 | Duignan |
| 2004/0018107 A1* | 1/2004 | Khoshnevis ........... B33Y 10/00 425/78 |
| 2009/0130427 A1* | 5/2009 | Grigoropoulos ....... B82Y 10/00 428/323 |

FOREIGN PATENT DOCUMENTS

| | | |
|---|---|---|
| EP | 0513538 A2 | 11/1992 |
| JP | 53-976 A | 1/1978 |
| JP | 01-145651 A | 6/1989 |
| JP | 08-314155 A | 11/1996 |
| WO | WO 2013/024280 A1 | 2/2013 |
| WO | WO 2015/015484 A1 | 2/2015 |
| WO | WO 2016/124708 A1 | 8/2016 |

OTHER PUBLICATIONS

National Intellectual Property Administration, PRC, Notification of First Office Action in corresponding Chinese Patent Application No. 2019800110888 dated May 24, 2022.

* cited by examiner

METHOD AND APPARATUS FOR CREATING AND SINTERING FINE LINES AND PATTERNS

CROSS-REFERENCE TO RELATED APPLICATIONS

This patent application is a U.S. National Phase of PCT International Application No. PCT/NL2019/050051, filed Jan. 30, 2019, which claims priority to European Application No. 18154524.5 filed Jan. 31, 2018, which are both expressly incorporated by reference in their entireties, including any references contained therein.

FIELD OF THE INVENTION

The invention relates to an enhanced method and apparatus to create and sinter fine lines and patterns.

BACKGROUND OF THE INVENTION

Several methods exist to create fine lines on a substrate. These methods can be subdivided in two main categories. Contact and non-contact based deposition methods. Typically printing of conductive pastes is based on a contacting method. For example, (rotary) screen printing comprises the printing of conductive pastes. Although quite high resolutions (but still>20 μm) can be achieved, this method requires the screen to contact the surface. However, various device stacks may not allow contacting as they contain a barrier stack. Accordingly a contactless method for providing a patterned structure are desired. For example, inkjet printing has the advantage of being contactless. However, the nozzle size limits the usable particle size of conductive inks, and the maximum resolution is affected by the spreading (low viscosity) and drop size. There remains a desire for improved control over fast (and contactless) high resolution (<10 μm) patterning of a large area structures from materials with wide range of viscosities.

In "Three-Dimensional Printing of Interconnects by Laser Direct-Write of Silver Nanopastes" Piqué et al, Advanced Materials Volume 22, Issue 40, pages 4462-4466, Oct. 25, 2010 a laser direct write method is illustrated of a solvent based, dried nanosilver paste that is transferred to a substrate, in order to provide an alternative method for electrical wire bonding interconnects for bare die LEDs. This direct-write laser technique is capable of transferring a variety of materials onto a substrate also known as Laser-Induced Forward Transfer (LIFT). LIFT uses laser pulses to transfer small volumes of material from a donor film on to an acceptor substrate. A donor substrate is coated with a thin material film, and a laser beam is directed at the donor substrate/film interface. Throughout the duration of the pulse, laser energy is deposited at the laser spot into the interface, vaporizing a small amount of the material, thereby pushing and accelerating non-vaporized parts of the donor film towards the acceptor substrate.

EP2883709 describes a method similar to LIFT, however donor material is here transferred by means of a flash. The flash is selectively directed to the donor material by using a mask to prevent the flash energy to reach the donor material where no transfer is desired. To obtain a uniform transfer the material transfer regions are subdivided in separate raster elements.

A LIFT process as described is capable of creating small conductive tracks however the accuracy created is dependent on the manner on which the material is propelled from the donor surface and how the propelled material impacts the substrate on which the conductive track is to be formed. During the initial propulsion, during the flight as well as during the impact possible instabilities may cause the donor material to alter direction and create imperfections in the track created.

The material deposited is also subjected to the intense energy pulse and potentially is degraded thereby reducing the material performance.

US2009013042 relates to a patterning method wherein a focused laser beam is scanned over a donor substrate covered with a layer of donor material to leave a desired printing structure formed of remaining donor material on said donor substrate.

WO2013024280 discloses a LIFT-based patterning method wherein ink on a surface is ablated to leave behind a desired printing structure. After forming the printing structure the ink is transformed to form a metal structure, e.g. conductive track. Similar to US2009013042, tracks are defined by a double pass of a laser along either side of the track whereby the accuracy of created tracks is dependent on laser alignment and/or on the manner on which the material is propelled from the surface, limiting the ability to form fine conductive tracks. Scanning of a focused laser beam further limits processing speed, particularly for printing patterns requiring the propelling away of donor materials over large areas of the substrate.

In an alternative method, WO2013024280 disclose the use of a wide beam in combination with a mask to define the printing structure. This introduces alignment issues and additional process steps slowing down the fabrication process.

SUMMARY OF THE INVENTION

The invention aims to provide a contactless method to create small conductive tracks on a substrate. To this end a method is provided for selective material deposition, comprising depositing a first material on a substrate; followed by solidifying the first material selectively in a first solidified pattern by one or more energy beams; and followed by propelling non-solidified material away from the substrate by a large area photonic exposure, controlled in timing, energy and intensity to leave the solidified first pattern of the first material.

In the proposed method a first material is solidified, e.g. sintered in tracks, without transferring the material initially. Thereby the position of the track on the substrate is only dependent on the point where the energy beam is focused on the substrate. The unsolidified material is subsequently removed by means of a large area flash photonic exposure. Contrary to EP2883709 and WO2013024280 a high energy flash exposure is used to propel undesired material off a substrate after formation of a track. EP2883709 in contrast forms a track by transferring material to the substrate for adherence to it. Furthermore EP2883709 and WO2013024280 are only able to transfer the desired material by use of an additional mask or scanning laser beam to shield the track from the transfer energy. In contrast, the proposed method does not required an additional mask. The current invention relies on the adhesion of a desired solidified pattern to the substrate to prevent it from transferring away from the substrate. For example a first material is deposited on a substrate and solidified selectively in a solidified pattern by one or more energy beams scribing a fine line of e.g. less than 5 micrometer. Non-solidified material is propelled away from the substrate by a large area (bulk) photonic exposure that is controlled in energy, timing and intensity to leave the desired solidified pattern of the first material.

Whether or not the desired solidified pattern will remain on the substrate during propulsion of the non-solidified material by the flash may be controlled by how much energy is dissipated in the desired pattern, depending on how dense a pattern is that already has been sintered. It may also depend on how much adhesion force the non-solidified materials exerts on the desired solidified pattern during transfer.

The density of the pattern that is sintered can be increased by increasing the energy level in the sintering step either by increasing the laser power or decreasing the laser spot moving speed thereby increasing the time the laser spot is directed at a specific point on the pattern to be sintered. An option to minimise the time necessary for pre-sintering the desired pattern is pre-sintering the edges of a track in the desired pattern more pronounced than the centre of a track in the pattern. Herewith the desired track is protected most efficiently at the edge of the track from the pealing force of the propelled non-solidified material.

During propulsion of the non-solidified material from the substrate a force is exerted on the solidified pattern. This force is caused by breakup effects of non-solidified material that is propelled away from the substrate. Optionally this force can be reduced by inducing the non-solidified material to break up in smaller portions thereby reducing the force exerted by momentum of material propelled away and that is in contact with edges of the desired solidified track. This can be achieved by addition of a secondary solidified pattern surrounding the pattern, for instance partly form-following, to force non-solidified material to break-up on propulsion. The secondary pattern may for instance be a conformal line, a dashed or dotted line or any shape capable of breaking-up a large propelled surface into smaller area's close to the desired first solidified pattern.

Optionally it is also possible to reduce the force propelled non-solidified material exerts on the desired solidified pattern by designing the edge of a track in such a way that the amount of edge area perpendicular to the main orientation of the desired track is minimalised, thereby providing an averaged force over time. This can be obtained e.g. by giving the track a notched design several alternatives are available such as a serrated, dentated, sawtooth, or toothed design.

In addition or alternatively it is also possible to choose how to deposit the initial first material. This can be done in bulk by means of for instance a curtain coated or any other suitable bulk deposition means. Alternatively the first material can be deposited selectively for instance by means of droplet deposition technique such as an inkjet printer thereby already minimising the amount of non-solidified material to be propelled away from the substrate.

DETAILED DESCRIPTION OF THE INVENTION

The following detailed description of certain exemplary embodiments is merely exemplary in nature and is in no way intended to limit the invention, its application, or uses. The description is therefore not to be taken in a limiting sense, and the scope of the present system is defined only by the appended claims. In the description, reference is made to the accompanying drawings which form a part hereof, and in which are shown by way of illustration specific embodiments in which the described devices and methods may be practiced. These embodiments are described in sufficient detail to enable those skilled in the art to practice the presently disclosed systems and methods, and it is to be understood that other embodiments may be utilized and that structural and logical changes may be made without departing from the spirit and scope of the present system. Moreover, for the purpose of clarity, detailed descriptions of well-known devices and methods are omitted so as not to obscure the description of the present system.

Figure 1:
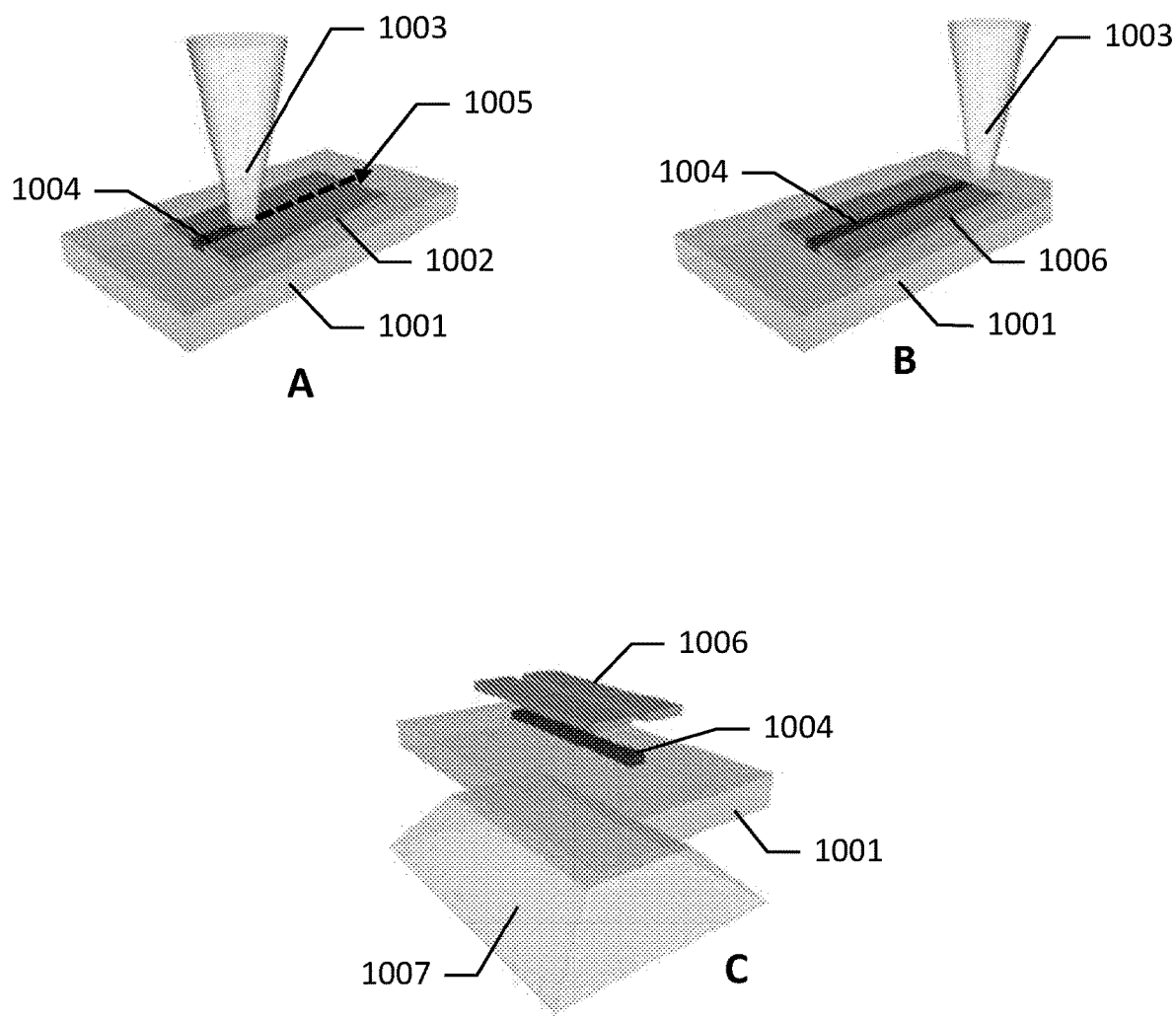
FIG. 1A,B, C Solidification by means of an energy beam in a layer of unsolidified material. Where the material was deposited in bulk.

FIG. 1 gives a schematic overview of some of the process steps involved. In FIG. 1A a first material 1002 is deposited on a substrate 1001, this can be done for instance in bulk by means of a curtain coater over the entire surface of the substrate, or for instance by using intermitted coating techniques on sub parts of the substrate where the desired first pattern should be generated. Subsequently an energy beam 1003 is directed to the first material and selectively solidifies the desired first pattern. The movement of the energy beam is here depicted by arrow 1005, creating the first solidified pattern 1004. FIG. 1B shows the situation when the energy beam has solidified the entire first pattern in this case schematically represented by a simple solidified track 1004. The non-solidified material 1006 is still present on the substrate. FIG. 1C shows the same substrate 1001 now in a slightly different orientation, here a large area photonic exposure 1007 is created resulting in propulsion of the non-solidified material 1006 away from the substrate 1001, leaving the first solidified pattern 1004 on the substrate 1001.

By using large area photonic exposure it is possible to remove the non-solidified material efficiently since all the non-solidified material in the area exposed by the large area photonic exposure will be transferred at once. Since it is desired to maintain the first solidified pattern on the substrate the large area photonic exposure needs to be uniform enough to allow all the non-solidified material to be propelled away from the surface, but not too high to delaminate the first solidified pattern. Several types of large area photonic exposure systems exist, such as flash systems, using Xenon lamps, or LED based systems. Dependent on the size of structures to be pattened and the uniformity required one single flash unit can cover the substrate, or multiple flash units are required to cover the substrate. A large area photonic exposure is not limited to a single photonic source but can be a combination of multiple sources creating a large area photonic exposure to allow coverage of the desired part of the substrate where non-solidified material needs to be removed. In some embodiments the substrate to be treated is limited in size and can be exposed in its entirety using the large area photonic exposure. In some embodiments one can imagine the substrate is too large, for instance when using a roll-to-roll process then the exposure is directed to the area of the substrate being processed in need of removal of non-solidified material. In this respect, 'large area photonic exposure' is the exposure to electromagnetic radiation in the visible and near visible wavelengths, that do not have a specified patterning for providing an imaged patterned. To the contrary, the electromagnetic radiation provides an area exposure of a substrate with a typical area that is about a typical length or area measure of the first solidified pattern, or larger than that. For example, a large area photonic exposure could expose a region at least two-ten times the line breath of a line pattern in the first solidified pattern, or much larger than that.

More specifically, the energy beams for solidifying the first solidified pattern typically have a spot size between 1 to 250 micron, preferably between 2 to 100 micron, even more preferably between 2 to 25 micron for solidification of highly defined features of the pattern. The large area photonic exposure is capable of propelling the non-solidified material away from the surface. The surface area exposed by the large area photonic exposure is typically at least more than 100 times larger than the surface area exposed by a single energy beam for solidification of the first solidified pattern. Preferably even more than 1000 times larger.

Figure 2:
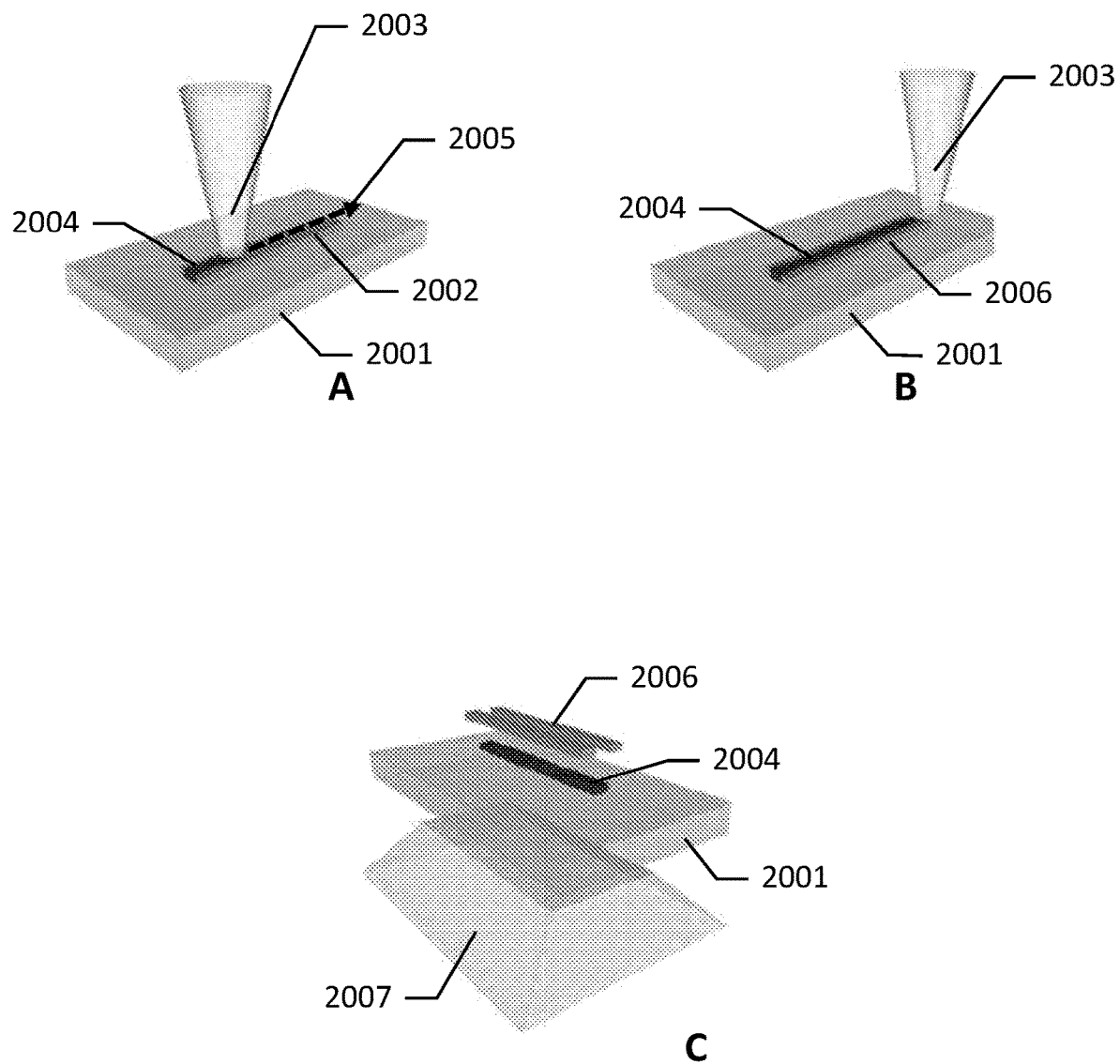
FIG. 2A,B,C Solidification by means of an energy beam in a track of unsolidified material. Where the material was deposited selectively only where the solidification pattern was desired.

FIG. 2 similar to FIG. 1 provides a schematic overview of some of the processing steps involved. However in this case the deposition of the first material is not done by merely coating the entire area where the desired pattern should be generated. But by means of a more selective material deposition technique. For instance by using a droplet deposition technique such as inkjet printing, dispensing or LIFT. The deposition of the first material can in such a manner already closer to the desired pattern. Since current selective deposition techniques are not able to create features in the desired resolution, the first material 2002, which has been selectively deposited on substrate 2001 is subsequently solidified by energy beam 2003 to form the first solidified pattern. The movement of the energy beam is here depicted by arrow 2005. As shown in FIG. 2B the unsolidified material 2006 remaining is severely reduces by using the selective deposition technique. FIG. 2C shows the same substrate 2001 now in a slightly different orientation, here a large area photonic exposure 2007 is created resulting in propulsion of the non-solidified material 2006 away from the substrate 2001, leaving the first solidified pattern 2004 on the substrate 2001.

Although it seems favourable to minimise the amount of unsolidified material the usage of inkjet or other selective deposition systems such as micro dosing, spray-deposition, dispensing or LIFT this however is not always possible. These selective deposition systems frequently pose limitations on the materials they can process, for instance on the maximum allowable viscosity processable. Therefore dependent on the material which is required for the creation of the first pattern either bulk or selective deposition can be chosen.

Figure 3:
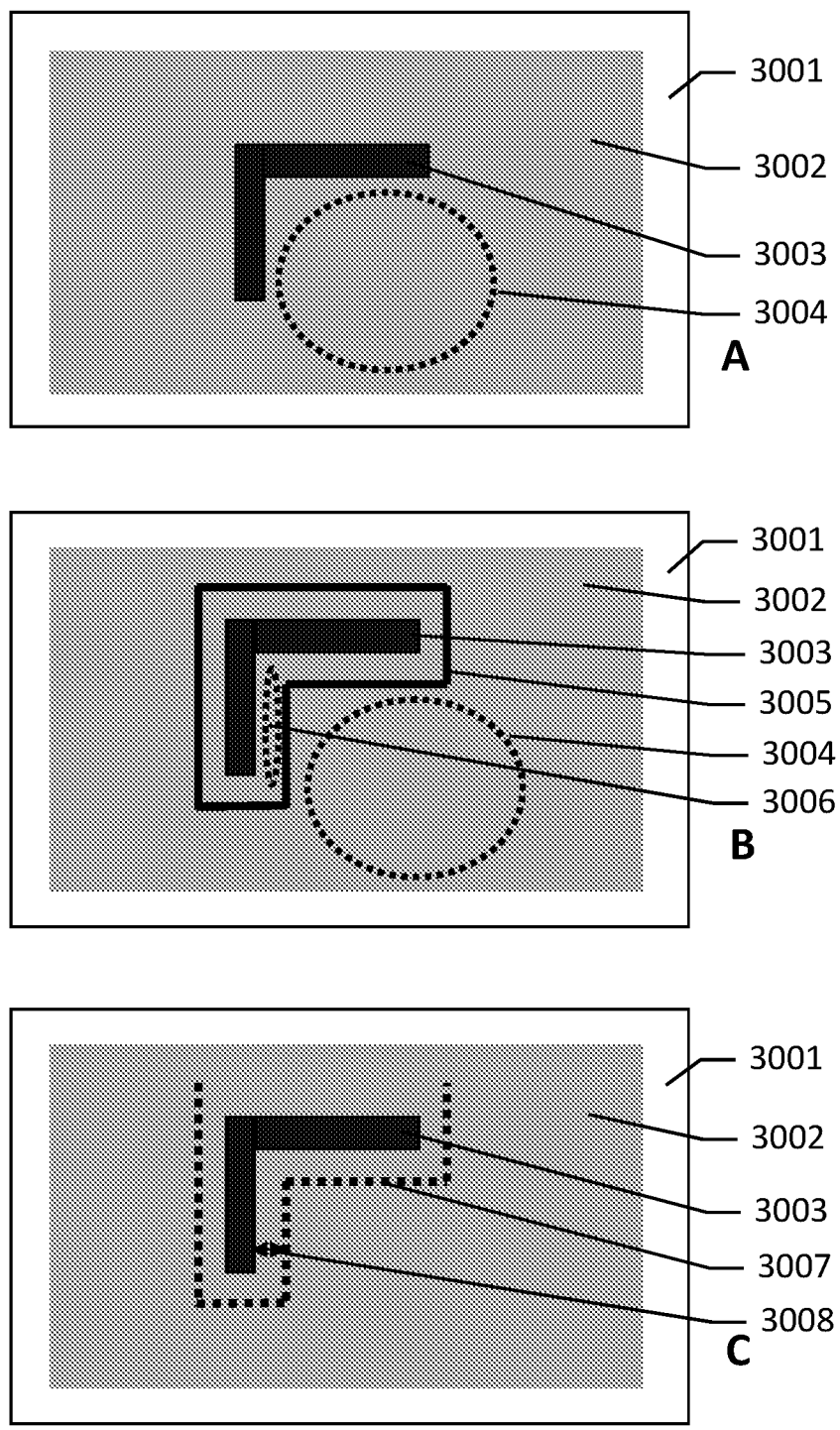
FIG. 3A An example of a first solidified pattern.
FIG. 3B An example of a first solidified pattern, and a complementary secondary solidified pattern in the form of a line surrounding the first solidified pattern.
FIG. 3C An example of a first solidified pattern, and a complementary secondary solidified pattern in the form of a dotted line surrounding the first solidified pattern.

FIG. 3A shows an example of a first solidified pattern 3003 on a substrate 3001 which has been covered by a first material 3002. As previously described the first material could also have been deposited selectively resulting in a coverage of the substrate with the first material more in line with the pattern to be created. When propelling the non-solidified material from the substrate the area circled 3004 will initially propel in its entirety from the substrate resulting in increased delamination forces on the first solidified pattern 3003. Dependent on the adhesion of the first solidified pattern to the substrate these forces may be allowable and a first solidification pattern as shown in FIG. 3A might be sufficient to prevent the desired first solidified pattern 3003 from delaminating from the substrate 3001 resulting in the small track desired.

FIG. 3B provides a solution in case the adhesion between the first solidified pattern 3003 and the substrate 3001 would be insufficient. By addition of a secondary solidified pattern 3004 complementary to the first solidified pattern 3003 the large area which initially propels from the surface 3005 is decoupled by the secondary solidified pattern 3004 from the now smaller surface area 3006. Therefore the non-solidified material will be propelled from the surface in sub areas. The smaller sub-area 3006 connected to the first solidified pattern exerts a significantly lower delamination force on the first solidified pattern 3003. This allows fine tracks to be created on a substrate even when the material intrinsically doesn't adhere well to the substrate. Or allows even finer tracks to be created which would not be able to provide enough adhering force to the substrate to counter the propulsion of the non-solidified material.

The secondary solidified pattern shown in FIG. 3B suggests it to be a continuous conformal track surrounding the first solidified pattern. However this is not required as shown in FIG. 3C the desired protection can also be provided by a non-continuous structure like a dashed or dotted line 3007. Any structure which prevents the area 3004 from reaching the edge of the first solidified pattern is sufficient.

The distance 3008 from the first solidified pattern and the secondary pattern measured perpendicular to the main edge of the solidified pattern is preferably between 0.1 and 500 micron, more preferably between 3 and 200 micron, and even more preferably between 5 and 100 micron.

If the distance from the edge of the first pattern to the edge between the non-solidified and non-coated area is sufficiently small, for instance similar in distance as the desired distance from the second solidified pattern would preferably be, these area's might not even need a protective secondary pattern in that area. Therefore the secondary solidified pattern need not be enclosing the entire first solidified pattern but is only required where there is an excess of non-solidified material connected to the first solidified material.

Figure 4:
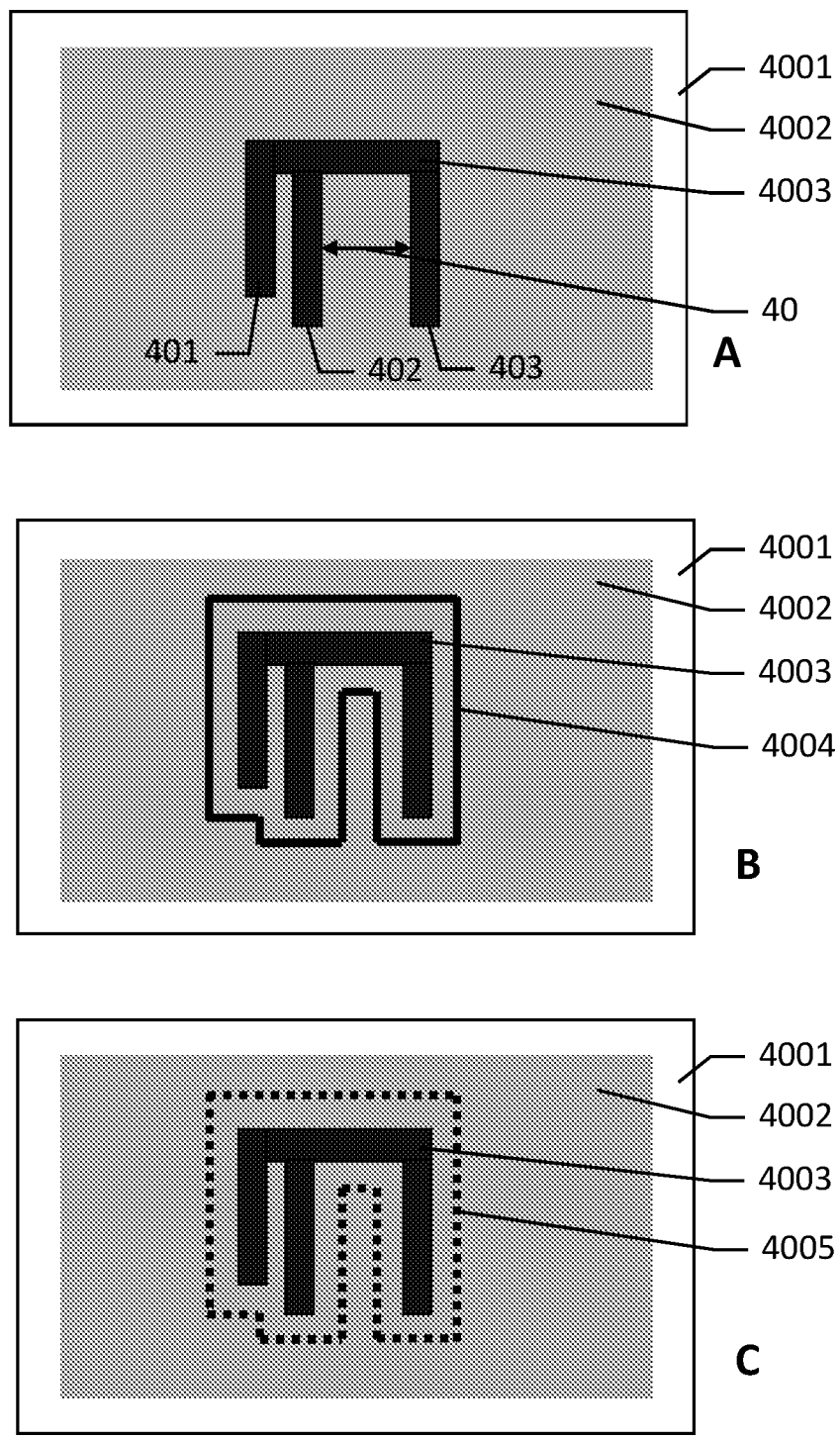
FIG. 4A An example of a first solidified pattern where the first solidified pattern has parts which are relatively close together and further away.
FIG. 4B An example of a first solidified pattern where the first solidified pattern has parts which are relatively close together and further away, and a complementary secondary solidified pattern in the form of a line surrounding the first solidified pattern.
FIG. 4C An example of a first solidification pattern where the first solidified pattern has parts which are relatively close together and further away, and a complementary secondary solidified pattern in the form of a dotted line surrounding the first solidified pattern.

FIG. 4 provides another example of a substrate 4001 provided with a first material 4002 wherein a first solidified pattern 4003 is depicted. Here an example of a first solidified pattern is shown having three tracks in parallel 401, 402 and 403. These tracks are parallel at a distance, however the distance between the edges of track 401 and 402 is relatively small, and the distance between track 402 and 403 is designed larger. This to provide an example where the need for the secondary solidified pattern is dependent on the amount of non-solidified material to be propelled next to the first solidified pattern. Between track 402 and 403 there might be the need to provide a secondary solidified pattern as shown in FIGS. 4B and 4C. The necessity to provide a secondary solidified pattern between track 401 and 402 does not exist since the amount of non-solidified material between both tracks is limited. The allowable distance between tracks within the first solidified pattern without the need of a an intermediate secondary solidified pattern depends on the adhesion force of the solidified pattern to the substrate, as well as the width of the track of the desired solidified pattern. The less the width of the track the less adhesion the entire track will have, therefore the less the distance between tracks within the first solidified pattern may be without a secondary solidified pattern.

If the distance 40 between two tracks within the first solidified pattern is less than 200 micron, more preferably less than 50 micron, and even more preferably less than 20 micron it is not necessary to add a secondary solidified pattern in-between.

As mentioned before a secondary solidified pattern might not even be necessary at all if the adhesion of the first solidified pattern and the substrate is high enough to prevent the first solidified material to be delaminated from the substrate during propulsion of the non-solidified material. If the first solidified pattern has relatively rough features and some delicate features it can be understood that possibly only a secondary solidified pattern is needed near the delicate features, since the rough features need no additional protection for them to remain at the substrate during propulsion of the non-solidified material.

In FIGS. 4B and 4C also the distinction is made between for instance a continuous pattern, a line to form the secondary solidified pattern 4004 and an intermitted pattern, a dashed or dotted line 4005. Wherein an advantage of the non-connected dashed or dotted variant 4005 is that these structure's are not connected and can therefore not conduit current if they remain on the substrate.

Figure 6:
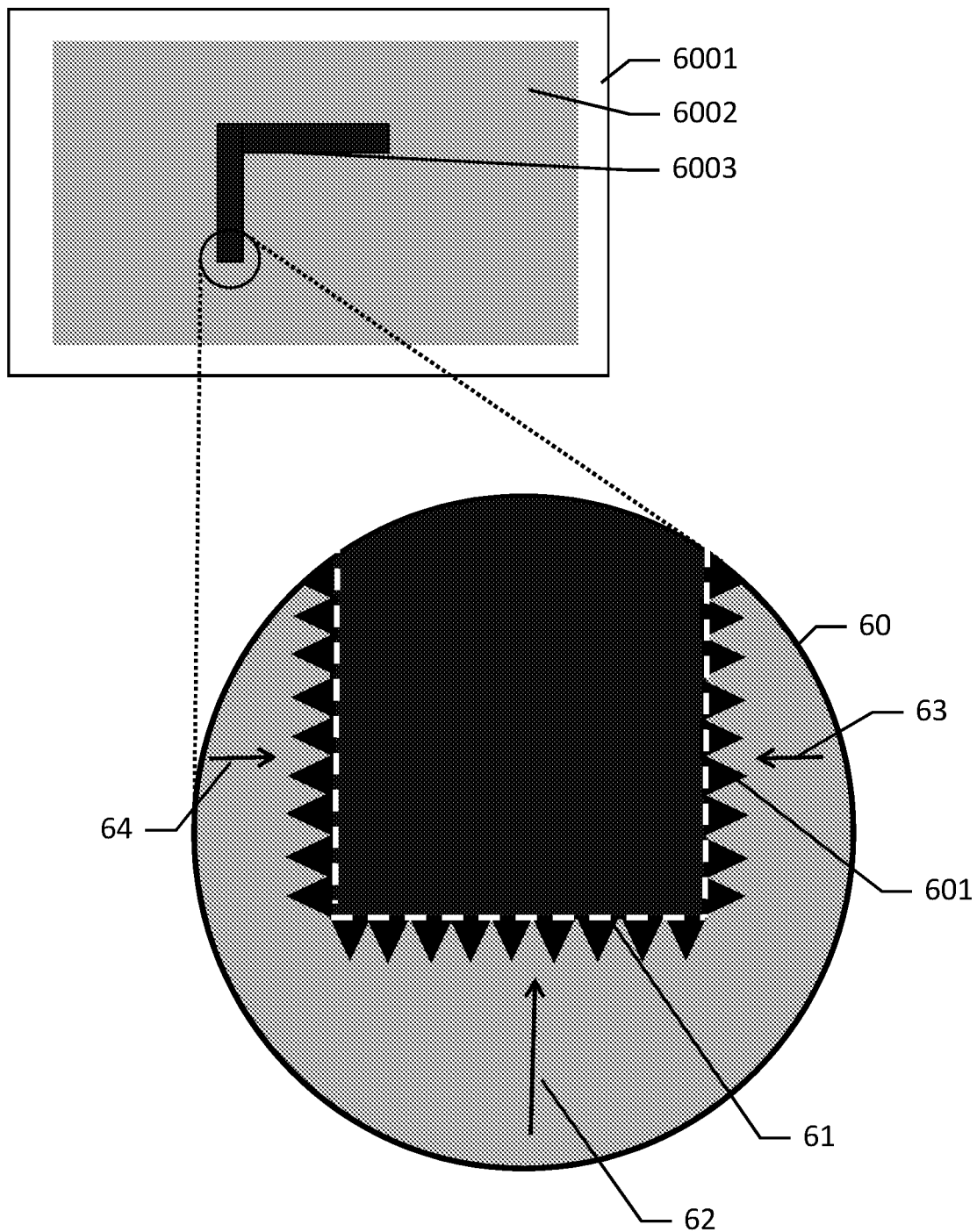
FIG. 6 An example of a first solidified pattern. A zoomed in section displays the edge structure of the first solidified pattern in detail, showing a sharp sawtooth profile.
Figure 7:
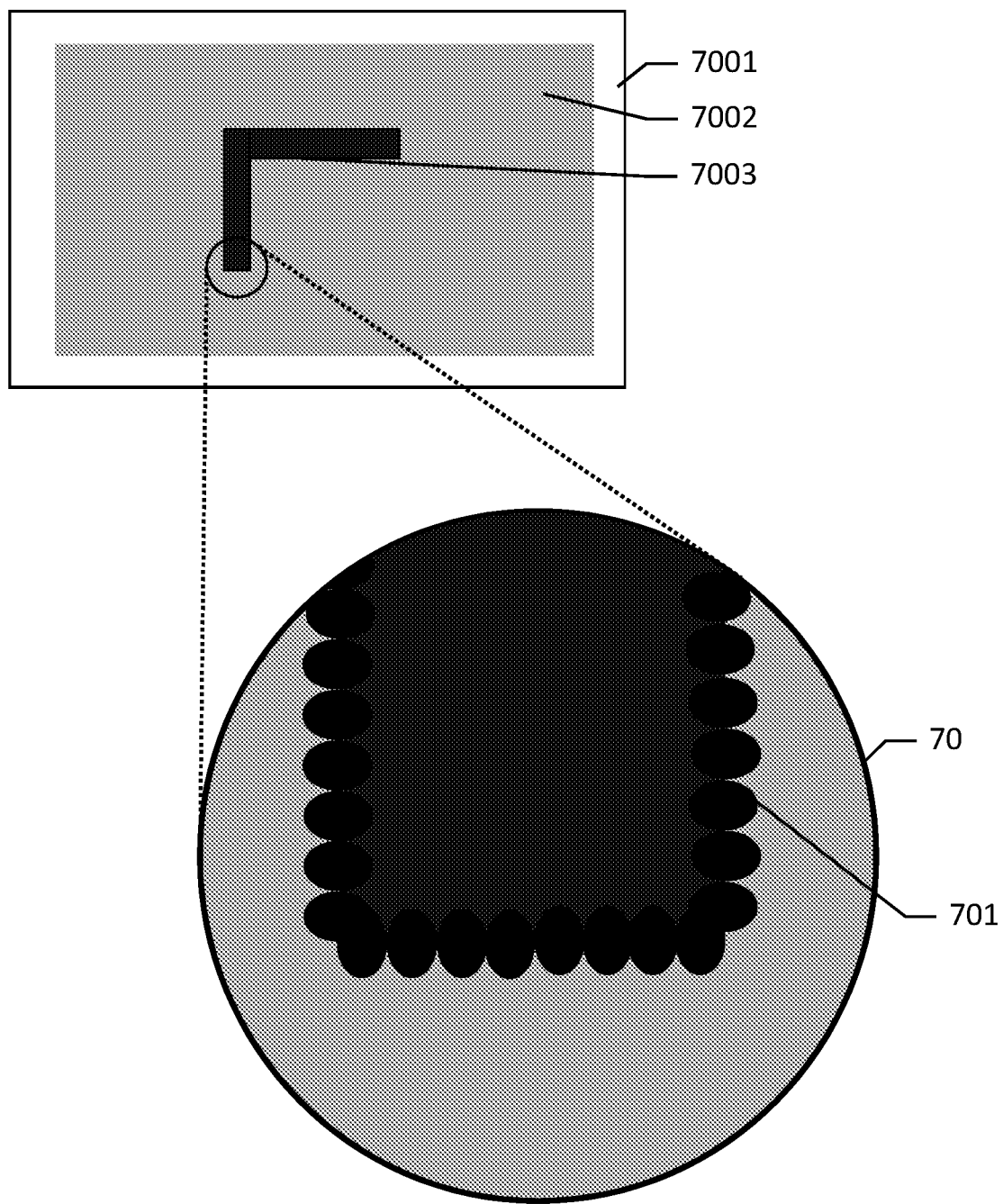
FIG. 7 An example of a first solidified pattern. A zoomed in section displays the edge structure of the first solidified pattern in detail, showing a more rounded edge profile.

It is noted that the above mentioned examples, of dashed or dotted lines can be any shape suitable that results in the non-solidified material to break-up during propulsion. The same applies to a continuous secondary solidified pattern. It can be a line of only several microns width which breaks-up the non-solidified material during propulsion but does not adhere to the surface enough to remain on the substrate and is therefore propelled away with the broken-up non-solidified material. The design of the secondary solidified material can therefore be optimized to either remain on the substrate during propulsion of the non-solidified material, or to be delaminated during this propulsion phase, still breaking-up the unsolidified material but not to remain on the surface. This balance can be reached by changing the surface area of the secondary solidified pattern or alternatively by changing the adherence of the secondary solidified pattern to the substrate for instance by changing the curing intensity of the secondary solidified pattern. Alternatively if it is desired for the secondary solidified pattern to remain on the substrate the edge of the secondary solidified pattern can be cured more intensely or be designed in such a way to average the force exerted on the pattern as shown in FIGS. 6 and 7 with respect to the first solidified pattern.

Figure 5:
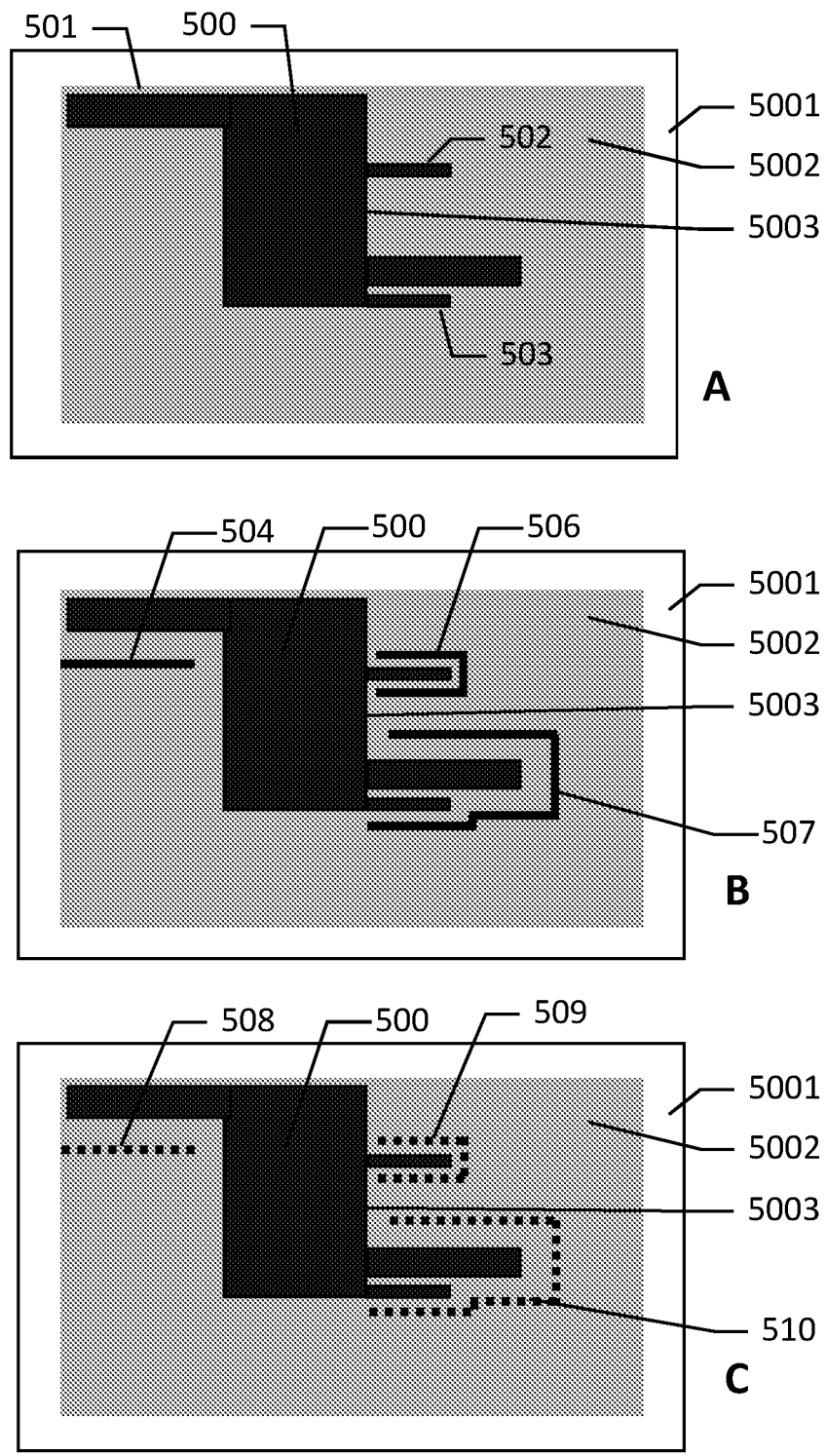
FIG. 5A An example more complex solidified pattern with multiple details.
FIG. 5B An example more complex solidified pattern with multiple details, and a complementary secondary solidified pattern in the form of a line surrounding the first solidified pattern.
FIG. 5C An example more complex solidified pattern with multiple details, and a complementary secondary solidified pattern in the form of a dotted line surrounding the first solidified pattern.

FIG. 5 shows a more complex example. In FIG. 5A shows an example of a first solidified pattern 5003 on a substrate 5001 which has been covered by a first material 5002. This can be a functional pattern if the adhesion between the first solidified pattern and the substrate 4001 is high enough to prevent the first solidified material to be delaminated from the substrate during propulsion of the non-solidified material. If this however is not sufficiently the case FIGS. 5B and 5C show a secondary solidified pattern added in critical locations. The relatively robust main part 500 of the first solidified pattern 5003 has enough adhesion surface to remain on the substrate during propulsion of the non-solidified material, therefore no specific secondary solidified pattern is needed for protection. The smaller track 501 might need additional protection, however on one side it is connected to the main part 500, and on two sides there is only little non-solidified material adjacent to it. Therefore on these sides no secondary solidified pattern is necessary. On the bottom however there is a large area of non-solidified material which might result in excess removal force and an secondary solidified pattern 504 is desired.

On the other side of the main part 500 there is a delicate track 502 which can be protected by a second solidified pattern 506.

Furthermore there is a combination of two tracks 503 shown. These tracks are positioned near to each other, therefore no secondary solidified pattern is required in-between, but due to their size it might be necessary to add a surrounding secondary solidified pattern 507. It can be noted that the distance between the track protected and the secondary solidified pattern may vary dependent on the width of the track protected, the smaller and more delicate the track which needs protection, the closer the secondary solidified pattern is positioned near the track to be protected to minimize the amount of non-solidified material next to it. FIG. 5C shows a similar structure to the structure shown in FIG. 5B however now using an alternative secondary solidified pattern in the shape of dots. As mentioned any shape suitable of breaking up a larger area of non-solidified material is useful, dots, circles, line tracks, diamond shapes, triangles, octagons, polygons, any random shape.

In FIGS. 6 and 7 another example of a substrate 6001, 7001 provided with a first material 6002, 7002 wherein a first solidified pattern 6003, 7003 is depicted. Here a zoomed in section 60, 70 is given, showing the edge of the first solidified pattern 6003, 7003 in more detail. In FIG. 6 the edge isn't a straight line, but has notches, in this example a sawtooth profile 601. As shown in FIG. 7 also different profiles can be applied such as a more rounded edge 701.

In FIG. 6 a dashed line 61 is shown which, without the sawtooth profile would logically have been the edge of the track. Arrows 62,63 and 64 show the main directions from which the shock waves from the propulsion of the non-solidified material would approach the first solidified pattern. If no profile would be present on the edge the shockwave traveling with arrow 62 would hit the straight edge over the entire width of that edge nearly at the same time providing a high peak force exerted on the track. The same applies for the shockwaves traveling in direction of arrows

63 and 64. By adjusting the profile as shown in FIGS. 6 and 7 using notches, such as a sawtooth, rounded or spiked structures the shockwave will hit the tops of these structures first, and will travel further towards the more recessed solidification pattern, thereby lengthening the contact time the shockwave is in contact with the edge, therewith averaging the force exerted to the track. This results in a longer, but significantly lower force being exerted to the track. If the force exerted remains below the threshold holding force of the track to the surface the first solidified pattern will not be pealed of the surface and remains on the substrate as desired. The example now shows a sawtooth and a rounded of edge profile it can however be understood that any edge profile which provides an outer edge which moves perpendicular direction to the main edge line 61 will provide this protection. Edge profiles designed using notches being sharp, rounded or a combination of both give the desired result.

The example above is showing a first solidified pattern with a notched edge, also the secondary solidified pattern can be designed to have a similar notched edge. For instance to control the moment during the propulsion of the non-solidified material in which the pattern releases, or have elements or the entire secondary pattern remain on the surface.

Figure 8:
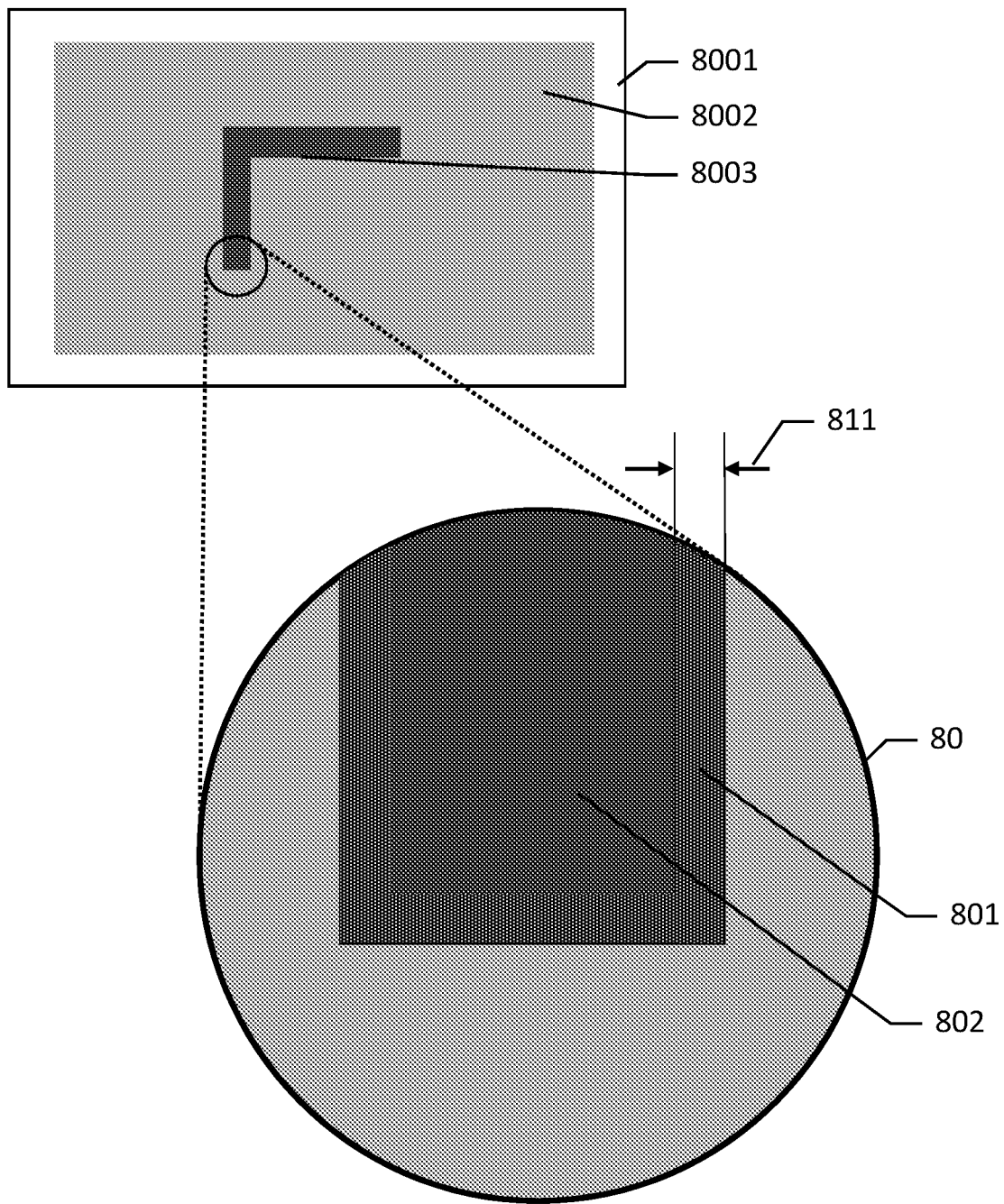
FIG. 8 Shows another example of a substrate.

In FIG. 8 another example of a substrate 8001 provided with a first material 8002 wherein a first solidified pattern 8003 is depicted. Here a zoomed in section 80 is given, showing a section of the first solidified pattern in more detail.

Alternatively to an edge profile one can choose to sinter the edge part 801 more severe than the core 802 of the track, also protecting the track from being peeled of during propulsion of the non-solidified material. If the edge part 801 of the track isn't peeled of the remaining section of the solidified track will also remain on the substrate. The width 811 of the edge part to be cured or sintered more severely is typically between 1 and 30 micron. more preferably between 2 and 25 micron, and even more preferably between 2 and 10 micron. Even when creating thin tracks such as 8 micron width an edge part of 2 micron can still result in significant process speed optimisation since only ½ of the track needs to be cured more intense while still resulting in enough adhesion strength at the edge of the pattern to prevent the first solidified pattern to be peeled away during propulsion of the non-solidified material.

This technique can be applied to the first solidified pattern as well as to the secondary solidified pattern if desired.

To minimise the impact on the first solidified pattern during propulsion of the non-solidified material the large area photonic exposure used can also be adjusted. It is for instance possible to use multiple flashes to also average the exerted force on the first solidified pattern. For instance by using double flashing, or a multitude of lower intensity flashes to obtain the same propulsion result but with a less intense peak force exerted on the first solidified pattern. Typical flash types which can be used have an intensity of 3-59 kW/cm2 and a pulse width between 1 μs and 10 milliseconds. The typical wavelengths present in these flashes range from 300 to 1200 nm.

A moving mirror might be suitable to direct the energy beam to the substrate, alternatively a prism, polygon or transmissive polygon can be used to direct the energy beam to the substrate.

Different types of energy sources can be used, conventional laser sources, diode lasers, LED's, electron beams, Xenon lamps dependent on the intensity and wavelengths needed to solidify the first solidified pattern.

It is also possible to only partially solidify the first solidified pattern, only enough for it to remain on the substrate during propulsion of the non-solidified material. Thereafter other sintering or curing means can be used to further solidify the first solidified pattern to its final structure. By heating the entire pattern in an oven, or alternatively use the large area photonic exposure system but now using different pulse and intension settings. Where no propulsion is achieved but still the track is exposed to a high enough energy level to fully solidify as desired.

If some parts of the structure are so delicate that the non-solidified material cannot be removed using the bulk photonic exposure it is also possible to remove the non-solidified material from these area's by using the energy source used for the solidification of the desired solidified pattern but now using pulse widths which will result in the non-solidified material to be removed from the substrate, either ablated or propelled away from the surface.

This can optionally be performed prior to large area photonic exposure to remove the non-critical parts of the non-solidified material.

In the examples of FIGS. 1 and 2 the energy beam and the bulk photonic exposure are shown to be directed from different sides of the substrate. This is not a necessity, the energy beam 1003, 2003 might also be directed through the substrate solidifying the pattern from the other side.

The solidification of the material can be a sintering solidification, where the solvent is evaporated and possible particles present in the material sinter together to obtain a conductive track. But also different types of solidification can be envisioned, such as UV or light curing compositions, which polymerise during exposure to a specific wavelength. Or other energy beam sensitive compositions.

In these case it is also possible to add a specific spectral filter to the flash unit to prevent the flash from solidifying the non-solidified material to be propelled from the substrate. Although the flash will instantly propel the material away and there will be no time for the material to adhere in this manner the material removed may be recycled without significant degradation.

The non-solidified material being propelled away can be collected on a surface or gutter positioned in the propulsion direction. The collected material can therefore be recycled.

The secondary solidified pattern is designed to break-up large area's of non-solidified material during propulsion of the non-solidified material of the substrate. Dependent on the dimensions and solidification state of the secondary solidified pattern the pattern will remain on the substrate, but it can also be designed as a sacrificial pattern which will be pealed away by the propelling non-solidified material during its propulsion and will therefore induce the break-up of the non-solidified propelled material but will not remain on the substrate.

In the latter case the non-solidified material which is propelled away can still be collected for recycling, but filtration might be required to remove solidified material parts from the secondary solidified pattern.

Finally, the above-discussion is intended to be merely illustrative of the present system and should not be construed as limiting the appended claims to any particular embodiment or group of embodiments. Thus, while the present system has been described in particular detail with reference to specific exemplary embodiments thereof, it should also be appreciated that numerous modifications and alternative embodiments may be devised by those having ordinary skill in the art without departing from the broader and intended spirit and scope of the present system as set forth in the claims that follow. The specification and drawings are accordingly to be regarded in an illustrative manner and are not intended to limit the scope of the appended claims.

In interpreting the appended claims, it should be understood that the word "comprising" does not exclude the presence of other elements or acts than those listed in a given claim; the word "a" or "an" preceding an element does not exclude the presence of a plurality of such elements; any reference signs in the claims do not limit their scope; several "means" may be represented by the same or different items or implemented structure or function; any of the disclosed devices or portions thereof may be combined together or separated into further portions unless specifically stated otherwise; no specific sequence of acts or steps is intended to be required unless specifically indicated; and no specific ordering of elements is intended to be required unless specifically indicated.

The invention claimed is:

1. A method for selective material deposition, the method comprising:
   depositing a layer of a first material on a substrate; followed by
   selectively solidifying portions of the layer of the first material in a first solidified pattern by one or more energy beams;
   selectively solidifying a further portion of the layer of the first material in a secondary solidified pattern by the one or more energy beams; and
   entirely exposing, after the selectively solidifying the portion and the selectively solidifying the further portion, the layer of the first material to a photonic exposure that is controlled in timing, energy and intensity so as to leave on the substrate only the portion of the layer of the first material in the first solidified pattern by:
      selectively propelling a non-solidified material portion of the layer of the first material away from the substrate; and
      further propelling, solidified material corresponding to the further portion of the layer of the first material in the secondary solidified pattern away from the substrate;
   wherein the secondary solidified pattern is:
      complementary to the first solidified pattern, and
      constructed to break up the non-solidified material portion during the entirely exposing.

2. The method according to claim 1, wherein the secondary solidified pattern comprises solidifications formed by a continuous line, a dashed line or a dotted line.

3. The method according to claim 1, wherein a smallest distance between the first solidified pattern and the secondary solidified pattern ranges between 5 and 250 micron.

4. The method according to claim 1, wherein the secondary solidified pattern only comprises solidifications of non-solidified material of the layer of the first material between facing, edges of the first solidified pattern spaced by at least 50 micron.

5. The method according to claim 1, wherein the first solidified pattern comprises an edge having notches for averaging a force exerted on the edge during the propelling the non-solidified material away from the substrate.

6. The method according to claim 1, wherein the first solidified pattern comprises edge parts and core parts, wherein the edge parts are exposed to the one or more energy beams longer than the core parts of the first solidified pattern to strengthen the first solidified pattern at the edge parts.

7. The method according to claim 1, further comprising sintering the first solidified pattern after the selectively propelling the non-solidified material portion.

8. The method according to claim 1, wherein the photonic exposure is performed by multiple energy pulses.

9. The method according claim 1 wherein the photonic exposure is created by a flash system with an energy density between 3 and 50 kW/cm2.

10. The method according to claim 1, wherein the layer of the first material is deposited in bulk during the depositing.

11. The method according to claim 1, wherein the layer of the first material is deposited selectively using a non-contact deposition technique during the depositing.

12. The method according to claim 1, wherein, the layer of the first material is deposited by droplet deposition during the depositing.

13. The method according to claim 1, wherein the one or more energy beams is created by a laser with a wavelength between 300 and 1200 nanometer.

14. The method according to claim 1, wherein the one or more energy beams are directed to the substrate by one or more movable mirrors.

15. A method for selective material deposition, the method comprising:
   depositing a layer of a first material on a substrate;
   selectively sintering, after the depositing the layer, portions of the layer of the first material in a first solidified pattern by one or more energy beams; and
   selectively propelling, after the selectively sintering portions of the layer of the first material in the first solidified pattern, non-solidified material away from the substrate by a photonic exposure exposing the entire deposited layer of the first material on the substrate, controlled in timing, energy and intensity to leave on the substrate the first solidified pattern of the first material.

* * * * *